Figure 1:
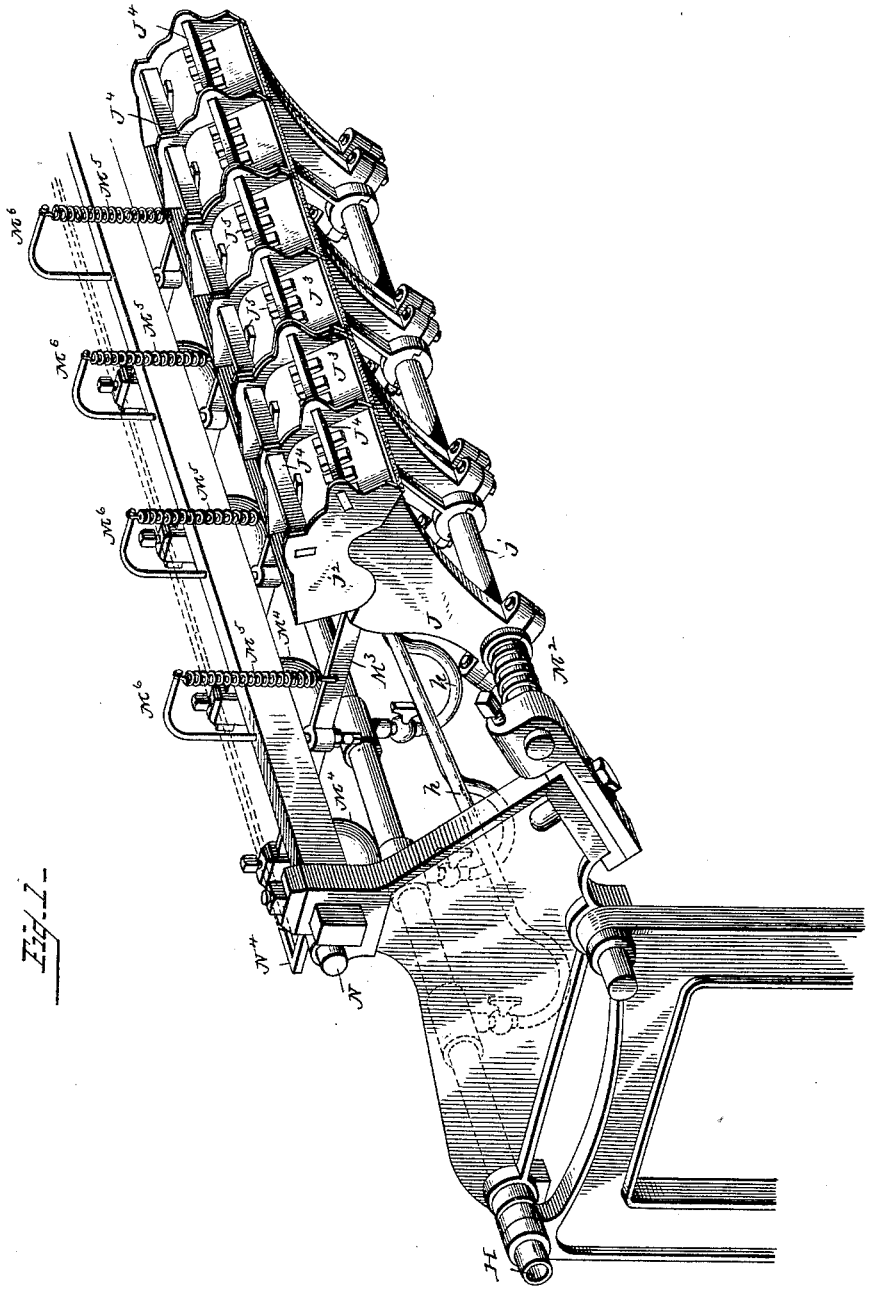

(No Model.) 2 Sheets—Sheet 1.

E. J. DOLAN.
SOLDERING MACHINE.

No. 399,386. Patented Mar. 12, 1889.

Witnesses
Inventor
Edward J. Dolan
By his Attorney
Franklin H. Hough

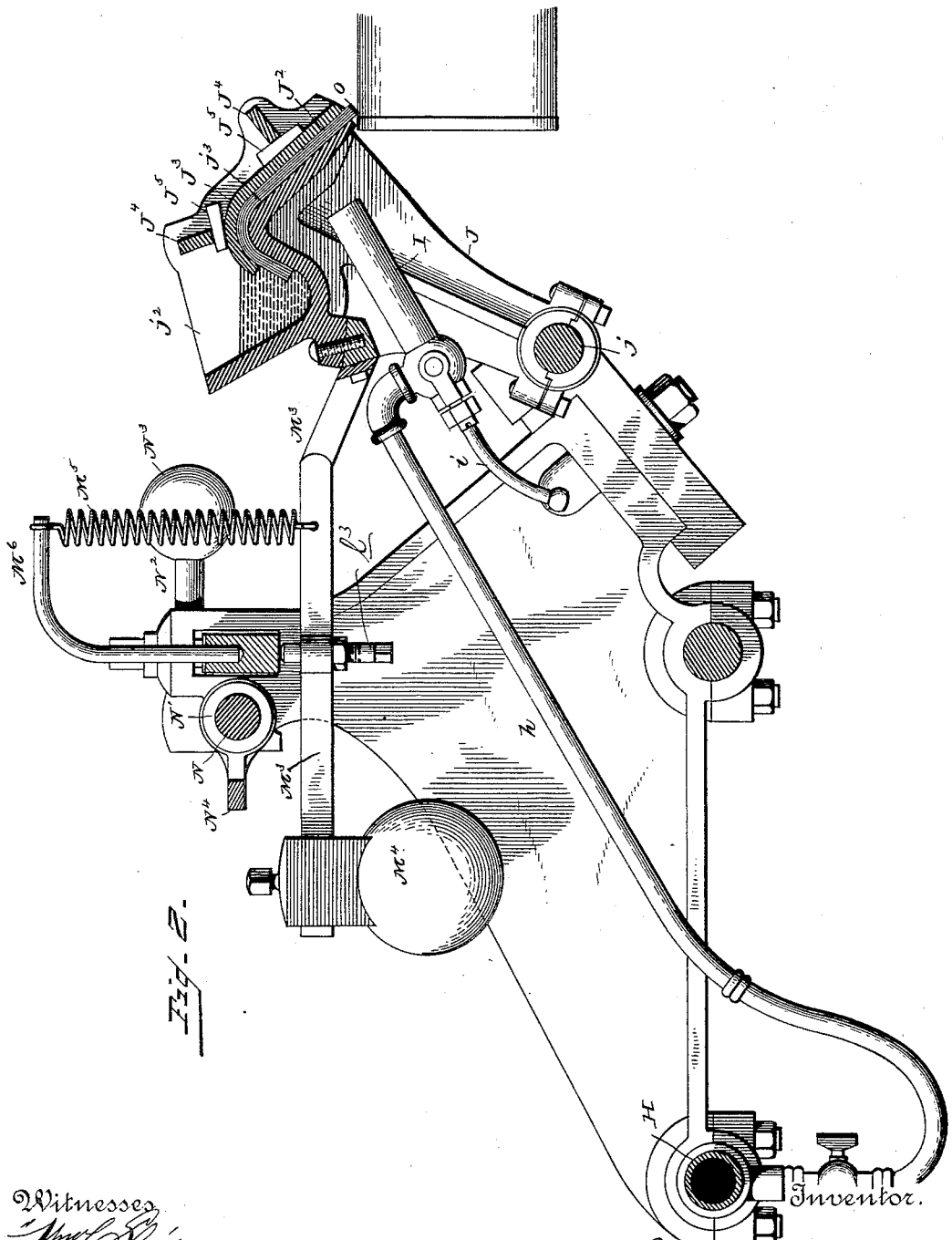

UNITED STATES PATENT OFFICE.

EDWARD J. DOLAN, OF PHILADELPHIA, PENNSYLVANIA, ASSIGNOR, BY MESNE ASSIGNMENTS, TO THE BUREAU CAN AND MANUFACTURING COMPANY, OF DELAWARE.

SOLDERING-MACHINE.

SPECIFICATION forming part of Letters Patent No. 399,386, dated March 12, 1889.

Application filed September 18, 1888. Serial No. 285,730. (No model.)

*To all whom it may concern:*

Be it known that I, EDWARD J. DOLAN, a citizen of the United States, residing at Philadelphia, in the county of Philadelphia and State of Pennsylvania, have invented certain new and useful Improvements in Soldering-Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in machines for soldering the seams of sheet metal, and it more particularly relates to the soldering of sheet-metal cans; and it has for its object to simplify and otherwise improve upon previous devices of this character, to effect a saving in the solder, and to provide a free and uniform flow of the solder to the seam at all times, thus insuring the perfect soldering of the seam, notwithstanding slight inequalities that may exist in the sheet metal or slight imperfections in the form of the can.

A further object of the invention is to provide a soldering-machine in which the solder is melted within a suitable chamber and carried by capillary attraction from the chamber in which it is melted to the seam of the can, the mechanism being of such construction as to utilize the same blaze of burner in melting the solder and in maintaining a flow of the solder.

To these ends, and to such others as the invention may pertain, the same consists in the peculiar combinations and in the novel construction, arrangement, and adaptation of parts, all as more fully hereinafter described, shown in the accompanying drawings, and then specifically defined in the appended claims.

The invention is clearly illustrated in the accompanying drawings, which, with the letters of reference marked thereon, form a part of this specification, and in which—

Figure 1 is a perspective view of a sufficient portion of a machine constructed in accordance with my invention to fully illustrate its construction and operation. Fig. 2 is a transverse section of the same.

In Fig. 1 of the drawings I have illustrated six of the soldering-irons; but it is to be understood that this number may be increased or diminished at pleasure. The specific construction of the irons and burner may be seen on reference to Fig. 2, in which H is the gas-supply pipe, suitably supported on the frame A of the machine, and provided with suitable outlets governed by cocks, as shown, to which are connected the flexible pipes $h$, communicating with the burner I, each burner being provided with a suitable air-inlet pipe, $i$. These burners being of any approved or well-known construction, I have not shown them in detail, and a further description of them in this connection is unnecessary.

The soldering-irons are constructed as follows:

J is a casting of suitable shape, pivoted on the shaft $j$, and provided upon the rear portion of its upper face with a solder trough or chamber, $j^2$.

$J^2$ represents a series of parallel wires arranged in proximity and extending from the interior of the solder-chamber over the front edge of the same, and thence downward over the upper inclined face of the casting J, and terminating at a point slightly beyond the outer edge of the same, where they together serve to form the soldering-iron proper, $o$, which is designed to bear upon the can at the point at which the solder is to be applied during the process of manufacture. The cans are designed to be carried along by some suitable machinery. (Not shown, but preferably such as I have described in some of my previous patents.)

$J^3$ is a plate of metal corresponding in form with the upper face of the front portion of the casting J, and it is fitted down upon the upper faces of the wires $J^2$ and serves to retain the same in place against the upper face, $j^3$, of the casting.

$J^4 J^4$ are longitudinal bars or rods having their ends secured within the inner ends of the casting J at points slightly above the plate $J^3$, and said plate is held securely in place by means of metallic wedges J⁵, which are driven in between the upper face of the plate and the lower edges of the bars J⁴, as will clearly appear upon reference to Fig. 2 of the drawings.

The burner I is passed into the hollow interior of the lower portion of the casting J through suitable openings formed for the purpose in the rear face of the casting, and it is designed by means of said burner to keep the entire casting heated to such a degree of temperature as to insure the solder both within the solder-chamber and between the wires being kept at all times in a molten condition.

The castings J are arranged in proximity, as is clearly shown in Fig. 1, and are sleeved upon the shaft $j$. These castings are in all respects similar, and in order to insure at all times a close contact of each of the soldering-irons with that of the next adjacent in the series I provide a spiral spring, M², loosely sleeved upon the end of the shaft $j$, and adapted to bear against the outer end of the first casting in the series.

M³ is a rod secured at one end to the rear face of the casting J.

M⁴ is a weight adjustably secured to the rear end of the rod M³, and serves the purpose of regulating the pressure of the soldering-iron upon the seam, as will be readily understood upon reference to Fig. 2.

M⁵ is a spiral spring connected at one end with a support or bracket, M⁶, and supporting the rod M³.

Each of the several castings J, sleeved upon the shaft $j$, acts independently of the remaining castings in the series, and each is provided with a rod, M³, and is counterbalanced in the manner described.

$l^3$ is a set-screw tapped through the rod M³ and bearing against the lower face of the support of the bracket M⁶. By the adjustment of this set-screw the movement of the arm may be adjusted.

The seam of each can, as it is carried past the series of soldering-irons, which may be done in any suitable manner, so as to present either the side or end seam, as desired, (mechanism for this purpose being well known in the art,) is acted upon in turn by each of the irons, so that in case the seam is not perfectly soldered by the first iron a perfect soldering of the seam is insured by the contact of the next irons in the series.

N is a shaft extending the entire length of the machine upon a higher plane than that of the soldering-irons.

N′ is a casting sleeved upon said shaft and provided with an arm, N², at its outer end, carrying a weight, N³. Extending along the entire length of the casting N′, at its rear side, is a rod, N⁴, forming a part of the casting.

It will be seen that when at any time it may be considered as desirable to lift all of the soldering-irons simultaneously from contact with the cans by lifting the weight N³ from a horizontal to a vertical position the rod N⁴ will be thus depressed and will bear downward against the upper faces of the weight-rods M³, thus depressing their rear ends and raising the soldering-irons, and by reversing the weight N³, so as to cause it to occupy the position shown in Fig. 2, the rod N⁴ is raised from contact with the rods M³, and the irons are returned to their former position.

Although I have shown and described a series of parallel wires as the medium for conducting the molten solder from the solder-chamber to the seam of the can, and I at present prefer such construction, still it is at once evident that iron filings or other substances of a like nature could be substituted for the wires, the flow of the solder being maintained by means of capillary attraction through the spaces intervening between the particles of the filings, instead of the spaces between the wires.

I prefer the use of wires that have been tinned.

What I claim to be new, and desire to secure by Letters Patent, is—

1. A soldering-instrument consisting of a number of separate bodies affording capillary interstices for the passage of molten solder, substantially as described.

2. In a soldering-machine, a solder-feed formed of a plurality of wires, substantially as described.

3. In a soldering-machine, a siphonic solder-feed formed of a plurality of wires, substantially as described.

4. A solder-feeder consisting of a number of separate bodies arranged in the form of a siphon and affording capillary interstices for the passage of molten solder, substantially as described.

5. In a soldering-machine, a capillary siphonic solder-feed formed of a plurality of wires compressed, substantially as described.

6. The combination, with the solder-holder, of a plurality of wires, a plate for holding said wires against said holder, and means for holding said plate upon the wires and holder, substantially as and for the purpose specified.

7. The combination, with the solder-holder and the longitudinal bars above the same, of the plate, the wires between said plate and the holder, and keepers for holding said plate in position, substantially as described.

8. The combination, with the solder-holder and the longitudinal bars above the same, of the plate, the plurality of wires between said plate and holder, and the wedges between the bars and plate, substantially as and for the purpose specified.

9. A solder-feeder formed of a plurality of separate bodies, affording capillary interstices for the passage of molten solder, with one end forming the point of the soldering-iron, substantially as described.

10. A combined siphonic solder-feeder and iron formed of a plurality of separate bodies arranged near each other and affording capillary interstices for the passage of the molten solder, substantially as described.

11. In a soldering-machine, a solder-holder and a solder-feeder composed of a plurality of wires arranged in the form of a siphon, one end of the said wires forming the point of the soldering-iron, substantially as described.

12. In a soldering-machine, the solder-holder, combined with a soldering-iron consisting of a plurality of wires having one end in said holder and the other end extending to the position of the parts to be soldered, substantially as described.

13. In a soldering-machine, a combined capillary solder-feeder and iron formed of a plurality of tinned wires, substantially as and for the purpose described.

In testimony whereof I affix my signature in presence of two witnesses.

EDWARD J. DOLAN.

Witnesses:
B. F. FULLER,
R. W. RUTHERFORD.